J. & A. H. HANNA.
AUTOMOBILE BUMPER.
APPLICATION FILED AUG. 29, 1910.
1,043,316.
Patented Nov. 5, 1912.
2 SHEETS—SHEET 1.
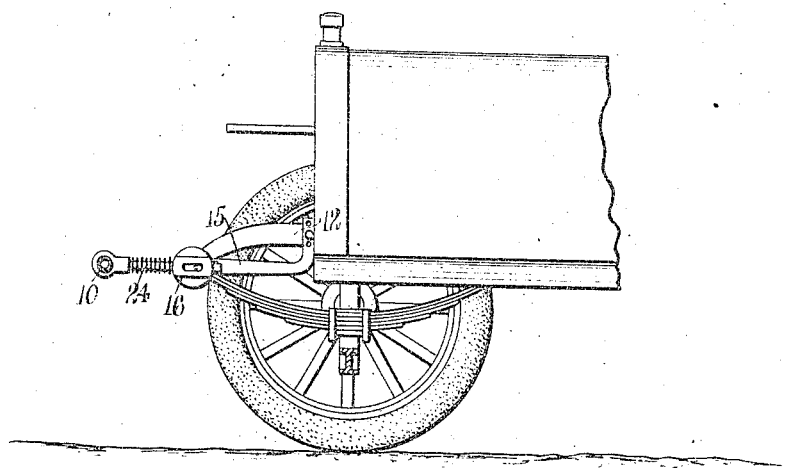
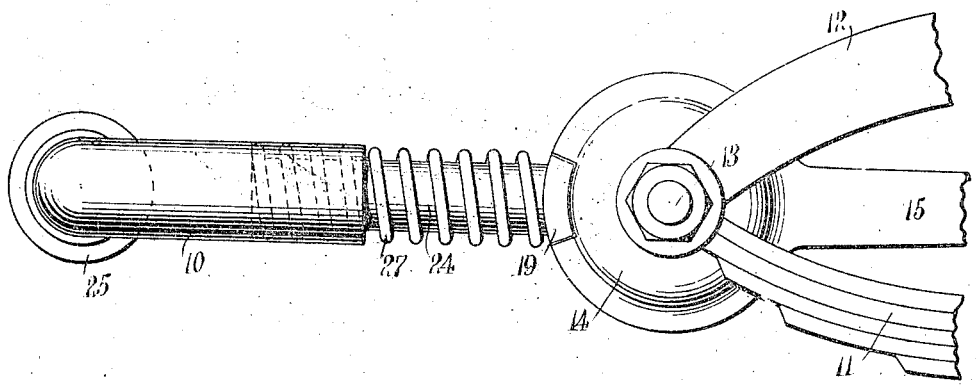
WITNESSES:
H. J. Walker
C. O. Fairbanks
INVENTORS
John Hanna
Albert Henry Hanna
BY
Munn & Co
ATTORNEYS

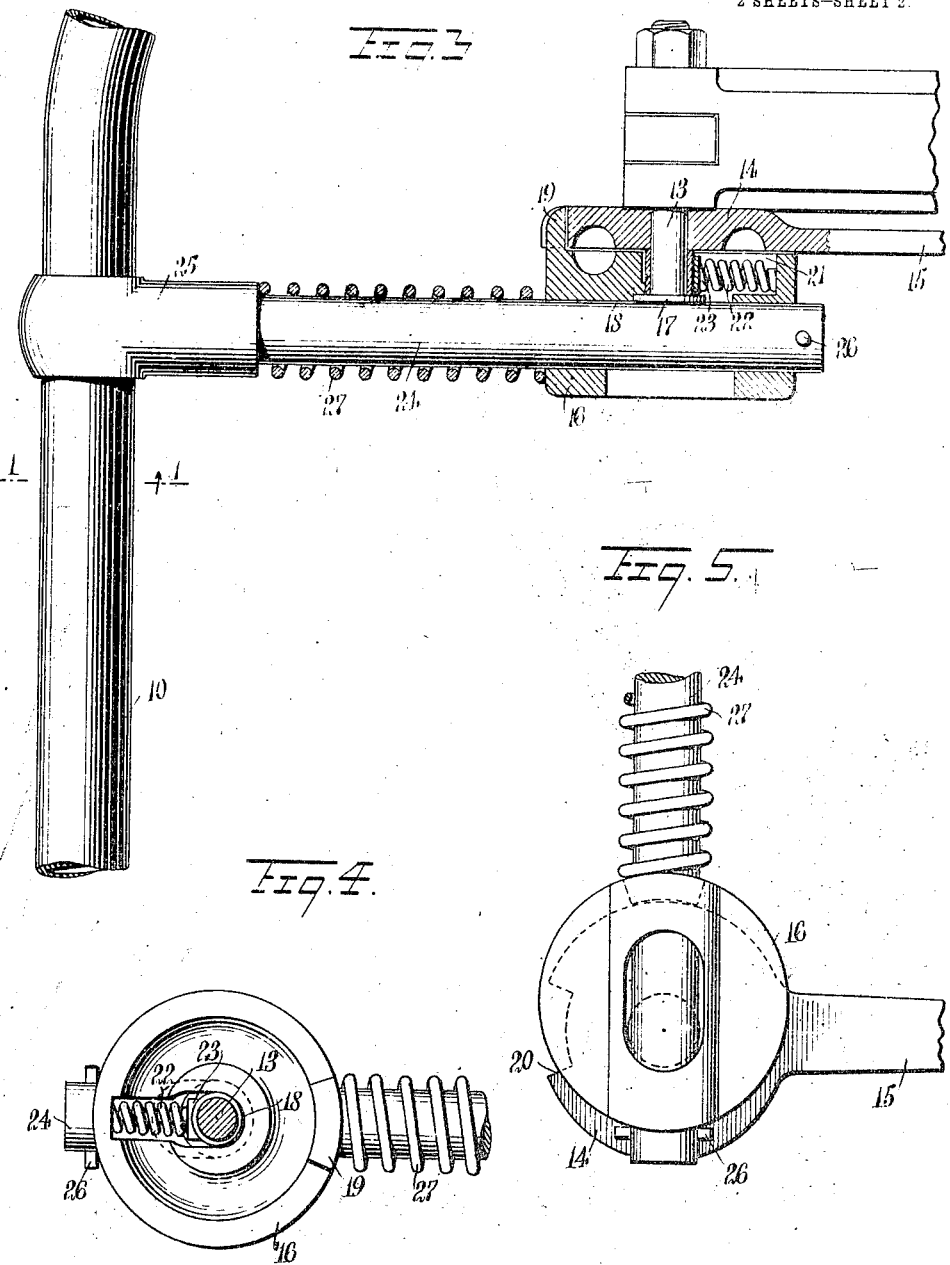

UNITED STATES PATENT OFFICE.

JOHN HANNA AND ALBERT HENRY HANNA, OF TROY, NEW YORK, ASSIGNORS TO JOHN P. RANDERSON, OF ALBANY, NEW YORK.

AUTOMOBILE-BUMPER.

1,043,316.  Specification of Letters Patent.  Patented Nov. 5, 1912.

Application filed August 29, 1910. Serial No. 579,390.

*To all whom it may concern:*

Be it known that we, JOHN HANNA and ALBERT HENRY HANNA, both citizens of the United States, and residents of Troy, in the county of Rensselaer and State of New York, have invented a new and Improved Automobile-Bumper, of which the following is a full, clear, and exact description.

Our present invention relates to certain improvements in bumpers or fenders for use on automobiles.

The object of the invention is to resiliently support the bumper or fender, by means permitting it to be readily moved to a position away from the crank of the engine, for reasons well understood.

In the accompanying drawings Figure 1 is a vertical section substantially on the line 1—1 of Fig. 3; Fig. 2 is an end elevation of the bumper and its support; Fig. 3 is a plan of a portion thereof, part of the support being shown in section; Fig. 4 is a side elevation of one of the locking plates for the bumper and the parts attached thereto; and Fig. 5 is a side elevation of the rotating joint of the bumper, the latter being raised.

In our improved construction we employ a transversely-extending rod or bar 10, constituting the bumper or fender bar, and of a length substantially equal to the width of the automobile. This fender bar is supported in advance of the car and is resiliently mounted, so that it will cushion the blow when the automobile encounters an obstruction. The ends of the bar are usually curved backward and the supports therefor are generally attached to the front ends of the springs of the automobile. These supports involve important features of our invention. As shown, the ordinary bolts employed at the front ends of the springs 11 for securing said springs to the chassis or frame 12 of the automobile are replaced by slightly longer bolts 13, upon each of which there is mounted a plate 14, prevented from rotation by a rearwardly-extending arm 15, the rear end of which may be bolted to the frame 12. As shown, this rear end extends upward substantially at right angles to the general direction of the frame, and is provided with a plurality of bolt holes, so that the plate 14 may be rotated to a limited extent and bolted or locked in adjusted position. In engagement with the plate 14 is a second plate 16, held by the bolt 13. The bolt has a thin head 17, which retains the plate, and a sleeve 18 preferably encircles the bolt and engages with the head and with the surface of the plate 14, so as to permit the bolt to be locked tight without causing the plates 14 and 16 to bind. The plate 16 is normally held against rotation on the sleeve 18 by a lug 19, fitting within a recess 20 in the periphery of the plate 14. The plate 16 can be rotated by moving it radially until the projection 19 comes out of the recess 20 beyond the periphery of the plate 14; to permit this, the plate 16 has a radial slot 21, through which the bolt 13 and sleeve 18 extend and which does not extend to the periphery of the plate, forming thereby a seat for a spring 22, disposed within it. This spring tends to hold the bolt at one end of the slot, which is about at the center of the plate 16. A small block 23 resting on the sleeve 18 may be employed to form an abutment for the spring.

Extending through and carried by the plate 16 is an arm 24, the forward end of which is rigidly connected to the bar 10 by the usual lug and collar 25. The arm is longitudinally movable through the plate, the forward movement being limited by a transversely-extending pin 26. A spring 27 encircles the arm and engages with the plate, so as to press the bar 10 and the supporting arm forward. Of course one of the mechanisms just described is on each side of the automobile.

The bumper when in operative position is disposed as illustrated in Figs. 1, 2 and 3; the rod 10 extends across the front of the vehicle, and is resiliently pressed forward by the springs 27, serving to cushion any blow, as will be readily understood. When so supported, however, the bumper interferes with the free cranking of the engine, it being necessary for the operator to step over it to reach the crank, as otherwise the proper amount of force could not be applied. In our improved construction, when it is desired to crank the engine, it is only necessary to pull forward the bumper 10, so that the pins 26 engage with the rear sides of the plates 16, and pull the latter forward with the bumper against the action of the springs 22, which being compressed permit the plates to move forward a distance substantially equal to the depth of the recess 20. This brings the projection 19 beyond the periphery of the plate 14; the bumper may then be raised or lowered to bring the arms 24 to a vertical plane, as indicated in Fig. 5. The parts easily remain in this position, as the spring 22 holds the projection 19 in sufficient frictional engagement with the periphery of the plate 14. If desired, the latter may be provided with a shallow recess on its upper side (not illustrated) to more effectively hold up the bumper, which when in its raised position is no longer in the way; as soon as the engine is started, the bumper is pulled down to a horizontal position, whereupon the parts lock automatically. Obviously the bar may be lowered instead of being raised, if desired.

Having thus described our invention, what we claim and desire to protect by Letters-Patent of the United States, is:—

1. A fender for automobiles, comprising a plate adapted to be secured to the frame of the automobile, a second plate rotatably secured thereto but normally locked against rotation, an arm, sliding connections between the arm and the second plate, and a fender bar carried by said arm, with means for manually releasing the second plate, such means permitting the automatic reëngagement of the lock when the plate is returned to normal position.

2. A fender for automobiles, comprising a plate carried by the automobile, a second plate connected thereto by means permitting both its rotation and its relative bodily displacement, a spring for normally preventing said bodily displacement, a lock for preventing rotative movement when said plates are held by said spring, an arm, a sliding connection between the arm and the second plate, resilient means for holding the arm in a forward limiting position, and a fender bar carried by said arm.

3. A fender for automobiles, comprising a fender bar, arms carrying the bar, means for securing the arms to the automobile, such means embracing a pair of disks, one of which is provided with a notch, and the other of which is provided with a lug coöperating with the notch to lock the two disks in a fixed position, a bolt about which one of the disks rotates, a slot in the disk in which the bolt moves and a spring for holding the bolt at one end of the slot, whereby by pulling upon the fender bar the lug may be disengaged from the notch and the fender bar be moved out of the way as described.

In testimony whereof we have signed our names to this specification in the presence of two subscribing witnesses.

JOHN HANNA.
ALBERT HENRY HANNA.

Witnesses:
 ALFRED J. NOLIN,
 DAVID E. RANDALL.